United States Patent
Schlumpf et al.

(10) Patent No.: US 12,104,005 B2
(45) Date of Patent: Oct. 1, 2024

(54) ISOCYANATE-GROUP-CONTAINING POLYMER HAVING A LOW CONTENT OF MONOMERIC DIISOCYANATES

(71) Applicant: SIKA TECHNOLOGY AG, Baar (CH)

(72) Inventors: Michael Schlumpf, Stallikon (CH); Sven Reimann, Zürich (CH); Berzad Durmic, Zufikon (CH)

(73) Assignee: SIKA TECHNOLOGY AG, Baar (CH)

( * ) Notice: Subject to any disclaimer, the term of this patent is extended or adjusted under 35 U.S.C. 154(b) by 773 days.

(21) Appl. No.: 17/264,184

(22) PCT Filed: Aug. 5, 2019

(86) PCT No.: PCT/EP2019/071051
§ 371 (c)(1),
(2) Date: Jan. 28, 2021

(87) PCT Pub. No.: WO2020/030608
PCT Pub. Date: Feb. 13, 2020

(65) Prior Publication Data
US 2021/0309786 A1   Oct. 7, 2021

(30) Foreign Application Priority Data
Aug. 8, 2018 (EP) ..................... 18187905

(51) Int. Cl.
| | | |
|---|---|---|
| C08G 18/10 | (2006.01) | |
| C08G 18/24 | (2006.01) | |
| C08G 18/30 | (2006.01) | |
| C08G 18/32 | (2006.01) | |
| C08G 18/48 | (2006.01) | |
| C08G 18/76 | (2006.01) | |
| C09D 175/08 | (2006.01) | |
| C09D 175/12 | (2006.01) | |
| C09J 5/00 | (2006.01) | |
| C09J 175/08 | (2006.01) | |
| C09J 175/12 | (2006.01) | |
| C08K 3/26 | (2006.01) | |

(52) U.S. Cl.
CPC .......... *C08G 18/10* (2013.01); *C08G 18/246* (2013.01); *C08G 18/307* (2013.01); *C08G 18/325* (2013.01); *C08G 18/4829* (2013.01); *C08G 18/4841* (2013.01); *C08G 18/7671* (2013.01); *C09D 175/08* (2013.01); *C09D 175/12* (2013.01); *C09J 5/00* (2013.01); *C09J 175/08* (2013.01); *C09J 175/12* (2013.01); *C08K 2003/265* (2013.01); *C09J 2475/00* (2013.01)

(58) Field of Classification Search
None
See application file for complete search history.

(56) References Cited

U.S. PATENT DOCUMENTS

| | | | | |
|---|---|---|---|---|
| 5,473,043 A | * | 12/1995 | Maki | .............. C08K 9/04 528/65 |
| 5,703,193 A | | 12/1997 | Rosenberg et al. | |
| 5,821,316 A | | 10/1998 | Quay et al. | |
| 2006/0020101 A1 | * | 1/2006 | Wintermantel | ........ C08G 18/10 528/44 |
| 2006/0128927 A1 | | 6/2006 | Gurtler et al. | |
| 2009/0202837 A1 | | 8/2009 | Onuoha et al. | |

FOREIGN PATENT DOCUMENTS

| | | |
|---|---|---|
| EP | 1 237 967 B1 | 1/2007 |
| EP | 1746117 A1 | 1/2007 |
| EP | 2439219 A1 | 4/2012 |
| JP | 2006-225670 A | 8/2006 |
| WO | 2011/051019 A1 | 5/2011 |
| WO | 2017/108834 A1 | 6/2017 |

OTHER PUBLICATIONS

BASF; Lupranol 2090 product data sheet; pp. 1-3. (Year: 2017).*
Oct. 15, 2019 International Search Report issued in International Patent Application No. PCT/EP2019/071051.
Feb. 9, 2021 International Preliminary Report on Patentability issued in International Patent Application No. PCT/EP2019/071051.

* cited by examiner

*Primary Examiner* — David J Buttner
(74) *Attorney, Agent, or Firm* — Oliff PLC

(57) ABSTRACT

A polyetherurethane polymer containing isocyanate groups and having an NCO content in the range from 1.3% to 1.9% by weight and a monomeric diisocyanate content of not more than 0.5% by weight, obtained from the reaction of at least one monomeric aromatic diisocyanate and a polyether triol having an average OH functionality in the range from 2.2 to 2.6 and an OH number in the range from 25 to 32 mg KOH/g in an NCO/OH ratio of at least 3/1 and subsequent removal of a majority of the monomeric diisocyanates by means of a suitable separation method, and to moisture-curing polyurethane compositions having a monomeric diisocyanate content of less than 0.1% by weight, comprising said polymer.

11 Claims, No Drawings

ISOCYANATE-GROUP-CONTAINING POLYMER HAVING A LOW CONTENT OF MONOMERIC DIISOCYANATES

TECHNICAL FIELD

The invention relates to polymers having a low monomer level for moisture-curing polyurethane compositions and to the use thereof as elastic adhesives, sealants and coatings.

STATE OF THE ART

Polyurethane compositions which crosslink through reaction of isocyanate groups with moisture or water and cure to give elastomers are especially used as elastic adhesives, sealants or coatings in the construction and manufacturing industry, for example for bonding of components in assembly, for filling joints, as floor coating or as roof seal. Owing to their good adhesion and elasticity, they can gently damp and buffer forces acting on the substrates, triggered for instance by vibrations or variations in temperature.

Such polyurethane compositions contain polymers containing isocyanate groups as binders, which are prepared by reacting polyols with monomeric diisocyanates. The polymers thus obtained, on account of chain extension reactions, contain a residual monomeric diisocyanate content, typically in the range from 1% to 3% by weight. Monomeric diisocyanates are potentially harmful to health. Formulations containing monomeric diisocyanates, over and above a concentration of 0.1% by weight, must be provided with hazard symbols and warning messages on the label and in the data sheets, and in some countries are subject to regulations in respect of sale and use.

There are various approaches to polymers containing isocyanate groups with a low monomeric diisocyanate content. One route is to use the monomeric diisocyanate in deficiency in the preparation of the polymer. However, this gives rise to highly chain-extended polymers having very high viscosity that lead to problems with storage stability and processability of the products.

A further route is to exchange symmetric for unsymmetric monomeric diisocyanates, for example diphenylmethane 4,4'-diisocyanates for diphenylmethane 2,4'-diisocyanate or tolylene 2,4-diisocyanates, in order to lower the proportion of chain extension reactions and hence achieve a lower viscosity of the polymer. However, polymers containing isocyanate groups that are prepared in this way are much less reactive. They lead to slow curing, and there is a distinct decline in the mechanical strengths attained in the products compared to those based on symmetric diisocyanates.

A further route is to partly react the polymer containing isocyanate groups with a functional compound, for example a mercaptosilane, aminosilane or hydroxyaldimine. The reaction products obtained, however, have different crosslinking characteristics and greatly elevated viscosity, and only have limited storage stability and processability.

EP 2,439,219 describes the use of silicon dioxide having surface amino groups for reduction of the monomeric diisocyanate content. However, the specific silicon dioxide is costly and likewise leads to high viscosities.

In terms of product properties, the most attractive route to polymers containing isocyanate groups that have a low monomeric diisocyanate content is to use the monomeric diisocyanate in excess in the preparation of the polymer and then to remove the majority of the unconverted monomeric diisocyanate by means of a suitable separation method, especially by means of distillation. Polymers from this process have a comparatively low viscosity and a low residual monomeric diisocyanate content. This route is particularly easy to perform with low molecular weight monomeric diisocyanates such as hexane diisocyanate. However, polymers prepared by this route also have disadvantages in the products, especially slower curing, deficiencies in build up of adhesion to the substrates, and reduced elasticity after curing.

Polymers based on aromatic monomeric diisocyanates are especially suitable for elastic adhesives, sealants and coatings, since they lead to fast curing and high strength coupled with high extensibility and elasticity. Diphenylmethane 4,4'-diisocyanate gives particularly good results. However, this is particularly difficult to remove by means of distillation on account of its low vapor pressure, especially from polymers of high molecular weight.

Polymers based on aromatic monomeric diisocyanates that contain isocyanate groups and have a reduced monomer level by means of distillation are known, for example from U.S. Pat. No. 5,703,193, where polymers based on poly(1, 4-butyleneoxy)diols and having an average molecular weight of about 1000 to 2000 g/mol are cured with butane-1,4-diol as curing agent at 100° C. to give elastomers, or from WO 2011/051019, where polymers based on propylene glycol diols having an average molecular weight of about 400 to 1000 g/mol are used as moisture-curing adhesives for beechwood. However, such short-chain linear polymers are unsuitable for use in moisture-curing polyurethane compositions having high extensibility and elasticity.

EP 1,237,967 discloses somewhat longer-chain linear polymers that have been freed of monomers and are based on diphenylmethane 4,4'-diisocyanate. In example 7, a polyether diol having an average molecular weight of 3000 g/mol is reacted with an excess of diphenylmethane 4,4'-diisocyanate and largely freed of monomer by means of distillation, and in example 24 is cured with an aromatic diamine at 100° C. When cured with moisture, however, this polymer leads to inadequate extensibility and elasticity.

In U.S. Pat. No. 5,821,316, in example 5, a polyol mixture comprising a polyether triol having an average molecular weight of 3000 g/mol is reacted with tolylene diisocyanate, largely freed of monomer by means of distillation and cured with an aromatic diamine at 75° C. When cured with moisture, however, this polymer cures only slowly and likewise leads to inadequate extensibility and elasticity. EP 1,746,117 discloses, in table 2, a polymer that has been freed of monomers and has an NCO content of 2.0% by weight, based on diphenylmethane 4,4'-diisocyanate, and a polyether triol having an OH functionality of 2.7 and an OH number of 28 mg KOH/g. Such a polymer is suitable in principle as a basis for one-component elastic polyurethane sealants and adhesives, but it is still in need of improvement in relation to extensibility and tear propagation resistance of the products obtainable therewith.

SUMMARY OF THE INVENTION

It is therefore an object of the present invention to provide a polymer containing isocyanate groups and having a low monomeric diisocyanate content which is suitable for the production of moisture-curing polyurethane compositions that can be handled safely without special safety precautions and can be sold in many countries without hazard labeling, cure rapidly to give a high-quality, nontacky, elastic material of high extensibility and are suitable for use as elastic adhesives, sealants and coatings.

This object is achieved by a polymer as described in claim 1. The polymer is based on aromatic monomeric diisocyanates, especially diphenylmethane 4,4'-diisocyanate, and a polyether triol having an average OH functionality in the range from 2.2 to 2.6 and an OH number in the range from 25 to 32 mg KOH/g. It has an NCO content in the range from 1.3 to 1.9% by weight and a monomeric diisocyanate content of not more than 0.5% by weight.

The polymer of the invention enables moisture-curing polyurethane compositions that have a very low residual monomeric diisocyanate content and hence can be safely handled without special safety precautions and show surprisingly good use properties. More particularly, they have very good processability, which, in the case of pasty compositions, is manifested in good expressibility, forming of short threads on removal of the application cartridge and good creep resistance, and, in the case of liquid compositions, in good leveling on application over an area. They have a surprisingly long open time and hence are easily processable even in the case of large-area and/or complex applications; they nevertheless cure rapidly, which is extremely advantageous in this combination in many applications. Compared to commercial labeling-free products, they have surprisingly high cold flexibility, better heat stability and better yellowing resistance. Compared to corresponding polymers containing isocyanate groups and having higher NCO content and/or based on polyether triols having higher OH functionality and/or higher OH number, they additionally enable surprisingly high extensibility coupled with high tensile strength and surprisingly high tear propagation resistance. With exclusion of moisture, they surprisingly have good storage stability, in spite of the high molecular weight of the polymer present and the high reactivity of the aromatic isocyanate groups.

Further aspects of the invention are the subject of further independent claims. Particularly preferred embodiments of the invention are the subject of the dependent claims.

Ways of Executing the Invention

The invention provides a polyetherurethane polymer containing isocyanate groups, characterized in that
  it has an NCO content in the range from 1.3% to 1.9% by weight, and
  a monomeric diisocyanate content of not more than 0.5% by weight,
  and in that it is obtained from the reaction of at least one monomeric aromatic diisocyanate and a polyether triol having an average OH functionality in the range from 2.2 to 2.6 and an OH number in the range from 25 to 32 mg KOH/g in an NCO/OH ratio of at least 3/1 and subsequent removal of a majority of the monomeric aromatic diisocyanate by means of a suitable separation method.

"Monomeric diisocyanate" refers to an organic compound having two isocyanate groups separated by a divalent hydrocarbyl radical having 4 to 15 carbon atoms.

An "aromatic" isocyanate group refers to one bonded directly to an aromatic carbon atom. Isocyanates having exclusively aromatic isocyanate groups are correspondingly referred to as "aromatic isocyanates".

An "aliphatic" isocyanate group refers to one bonded directly to an aliphatic or cycloaliphatic carbon atom. Isocyanates having exclusively aliphatic isocyanate groups are correspondingly referred to as "aliphatic isocyanates".

A "monomeric aromatic diisocyanate" refers to a monomeric diisocyanate having aromatic isocyanate groups.

A "polyetherurethane polymer" refers to a polymer having ether groups as repeat units and additionally containing urethane groups.

"NCO content" refers to the content of isocyanate groups in % by weight. "Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is determined by means of gel permeation chromatography (GPC) against polystyrene as standard, especially with tetrahydrofuran as mobile phase, refractive index detector and evaluation from 200 g/mol.

A substance or composition is referred to as "storage-stable" or "storable" when it can be stored at room temperature in a suitable container over a prolonged period, typically over at least 3 months to up to 6 months or more, without any change in its application or use properties to a degree of relevance for the use thereof as a result of the storage.

"Room temperature" refers to a temperature of 23° C.

All industry standards and norms mentioned in this document relate to the versions valid at the date of first filing.

Percentages by weight (% by weight), abbreviated to wt %, refer to proportions by mass of a constituent of a composition or a molecule, based on the overall composition or the overall molecule, unless stated otherwise. The terms "mass" and "weight" are used synonymously in the present document.

The polymer of the invention may also be referred to as polyurethane prepolymer.

Preferably, the polymer of the invention has an average molecular weight $M_n$ in the range from 5000 to 15 000 g/mol, determined by means of gel permeation chromatography (GPC) versus polystyrene standard with tetrahydrofuran as mobile phase, refractive index detector and evaluation from 200 g/mol.

More preferably, the average molecular weight is in the range from 5500 to 12 000 g/mol, especially in the range from 6000 to 10 000 g/mol.

Such a polymer enables moisture-curing polyurethane compositions having a particularly attractive combination of low viscosity, long open time coupled with rapid curing and high elasticity and strength.

The polymer of the invention preferably has a monomeric diisocyanate content of not more than 0.3% by weight, especially not more than 0.2% by weight. Such a polymer is particularly suitable for the production of elastic adhesives, sealants and coatings that have a monomeric diisocyanate content of less than 0.1% by weight; these can be safely handled even without special safety precautions and can thus be sold in many countries without hazard labeling.

A suitable monomeric aromatic diisocyanate is especially diphenylmethane 4,4'-diisocyanate, optionally with fractions of diphenylmethane 2,4'- and/or 2,2'-diisocyanate (MDI), tolylene 2,4-diisocyanate or mixtures thereof with tolylene 2,6-diisocyanate (TDI), phenylene 1,4-diisocyanate (PDI), 2,3,5,6-tetramethyl-1,4-diisocyanatobenzene, naphthalene 1,5-diisocyanate (NDI) or 3,3'-dimethyl-4,4'-diisocyanatodiphenyl (TODI).

Among these, preference is given to diphenylmethane 4,4'-diisocyanate or tolylene 2,4-diisocyanate or phenylene 1,4-diisocyanate.

A particularly preferred monomeric aromatic diisocyanate is diphenylmethane 4,4'-diisocyanate (4,4'-MDI). This 4,4'-MDI is of a quality that contains only small fractions of diphenylmethane 2,4'- and/or 2,2'-diisocyanate and is solid at room temperature. It enables moisture-curing polyurethane compositions having particularly rapid curing and particularly high strength coupled with high extensibility and elasticity.

The 4,4'-MDI has preferably been distilled and has a purity of at least 95%, especially at least 97.5%.

A commercially available diphenylmethane 4,4'-diisocyanate of this quality is, for example, Desmodur® 44 MC (from Covestro) or Lupranat® MRSS oder ME (from BASF) or Suprasec® 1400 (from Huntsman).

The polyether triol has an average OH functionality in the range from 2.2 to 2.6. As a result of their production, commercial polyether triols contain a certain content of monools, as a result of which their average OH functionality is typically somewhat below 3. They thus typically contain trifunctional and monofunctional components.

Repeat units present in the polyether triol are preferably 1,2-ethyleneoxy, 1,2-propyleneoxy, 1,3-propyleneoxy, 1,2-butyleneoxy or 1,4-butyleneoxy groups. Preference is given to 1,2-ethyleneoxy and/or 1,2-propyleneoxy groups.

More preferably, repeat units present in the polyether triol are mainly or exclusively 1,2-propyleneoxy groups. More particularly, the polyether triol, based on all repeat units, has 80% to 100% by weight of 1,2-propyleneoxy groups and 0% to 20% by weight of 1,2-ethyleneoxy groups.

Most preferably, the polyether triol, based on all repeat units, has 80% to 90% by weight of 1,2-propyleneoxy groups and 10% to 20% by weight of 1,2-ethyleneoxy groups. The 1,2-propyleneoxy groups and the 1,2-ethyleneoxy groups here each especially form homogeneous blocks, and the poly(1,2-ethyleneoxy) blocks are at the chain ends. Such a polyether triol enables moisture-curing polyurethane compositions having particularly rapid curing and particularly good heat stability.

The polyether triol preferably has an OH number in the range from 25 to 32 mg KOH/g and, based on all repeat units, has 80% to 90% by weight of 1,2-propyleneoxy groups and 10% to 20% by weight of 1,2-ethyleneoxy groups. Such a polymer enables moisture-curing polyurethane compositions having a particularly attractive combination of low viscosity, long open time coupled with rapid curing and high elasticity and strength.

The polyether triol preferably has an average molecular weight $M_n$ in the range from 4000 to 8500 g/mol, especially 5200 to 7500 g/mol.

The polyether triol has preferably been started by means of trimethylolpropane or especially glycerol.

Such polyether triols are commercially available, for example as Desmophen® 5031 BT (from Covestro), Voranol® 5815 (from Dow) or Caradol® ET28-03 (from Shell).

The polymer of the invention is obtained from the reaction of at least one monomeric aromatic diisocyanate and the polyether triol in an NCO/OH ratio of at least 3/1.

The NCO/OH ratio is preferably in the range from 3/1 to 10/1, more preferably in the range from 3/1 to 8/1, especially in the range from 4/1 to 7/1.

The reaction is preferably conducted with exclusion of moisture at a temperature in the range from 20 to 160° C., especially 40 to 140° C., optionally in the presence of suitable catalysts.

After the reaction, the monomeric diisocyanate remaining in the reaction mixture is removed by means of a suitable separation method down to the residual content described.

A preferred separation method is a distillative method, especially thin-film distillation or short-path distillation, preferably with application of reduced pressure.

Particular preference is given to a multistage method in which the monomeric aromatic diisocyanate is removed in a short-path evaporator with a jacket temperature in the range from 120 to 200° C. and a pressure of 0.001 to 0.5 mbar.

In the case of 4,4'-MDI, which is preferred as monomeric aromatic diisocyanate, distillative removal is particularly demanding. It has to be ensured, for example, that the condensate does not solidify and block the system. Preference is given to operating at a jacket temperature in the range from 160 to 200° C. at 0.001 to 0.5 mbar, and condensing the monomer removed at a temperature in the range from 40 to 60° C.

Preference is given to reacting the monomeric aromatic diisocyanate with the polyether triol and subsequently removing the majority of the monomeric diisocyanate remaining in the reaction mixture without the use of solvents or entraining agents.

Preference is given to subsequently reusing the aromatic monomeric diisocyanate removed after the reaction, i.e. using it again for the preparation of polyetherurethane polymer containing isocyanate groups.

Most preferably, the polyetherurethane polymer containing isocyanate groups has an NCO content in the range from 1.3% to 1.9% by weight and a monomeric diisocyanate content of not more than 0.3% by weight, and is obtained from the reaction of diphenylmethane 4,4'-diisocyanate with a polyether triol having an average OH functionality in the range from 2.2 to 2.6, an OH number in the range from 25 to 32 mg KOH/g and a content of 80% to 90% by weight of 1,2-propyleneoxy groups and 10% to 20% by weight of 1,2-ethyleneoxy groups, based on all repeat units in the polyether segment.

Such a polyetherurethane polymer containing isocyanate groups preferably has an average molecular weight $M_n$ in the range from 6000 to 10 000 g/mol. Such a polymer enables moisture-curing polyurethane compositions having a particularly attractive combination of low viscosity, long open time coupled with rapid curing and high elasticity and strength.

The polymer of the invention preferably has a viscosity at 20° C. of not more than 50 Pa·s, especially not more than 40 Pa·s, more preferably not more than 30 Pa·s. The viscosity is determined here with a cone-plate viscometer having a cone diameter 25 mm, cone angle 1°, cone tip-plate distance 0.05 mm, at a shear rate of 10 s$^{-1}$.

In the reaction, the OH groups of the polyether triol react with the isocyanate groups of the monomeric aromatic diisocyanate. This also results in what are called chain extension reactions, in that there is reaction of OH groups and/or isocyanate groups of reaction products between polyol and monomeric diisocyanate. The higher the NCO/OH ratio chosen, the lower the level of chain extension reactions that takes place, and the lower the polydispersity and hence also the viscosity of the polymer obtained. A measure of the chain extension reaction is the average molecular weight of the polymer, or the breadth and distribution of the peaks in the GPC analysis. A further measure is the effective NCO content of the polymer freed of monomers relative to the theoretical NCO content calculated from the reaction of every OH group with a monomeric aromatic diisocyanate.

The NCO content in the polymer of the invention is preferably at least 80%, especially at least 85%, of the theoretical NCO content which is calculated from the addition of one mole of monomeric diisocyanate per mole of OH groups of the polyether triol. Such a polyetherurethane polymer is particularly suitable for use in moisture-curing polyurethane compositions.

The polymer of the invention has low viscosity, contains a low content of monomeric diisocyanates and is very storage-stable with exclusion of moisture. It is particularly suitable for production of moisture-curing polyurethane compositions having excellent use properties.

The invention further provides a moisture-curing polyurethane composition having a content of monomeric diisocyanates of less than 0.1% by weight, based on the overall composition, comprising the inventive polyetherurethane polymer containing isocyanate groups.

The moisture-curing polyurethane composition preferably has a content of polymer of the invention in the range from 10% to 80% by weight, especially 15% to 70% by weight, more preferably 20% to 60% by weight.

In addition to the polymer of the invention, the moisture-curing polyurethane composition may contain at least one additional polymer containing isocyanate groups.

Suitable additional polymers containing isocyanate groups are conventionally prepared polymers or other polymers that have been freed of monomers. Further polymers containing aromatic isocyanate groups are suitable, but also polymers containing aliphatic isocyanate groups.

A preferred additional polymer containing isocyanate groups is a conventionally prepared polyurethane polymer containing isocyanate groups from the reaction of polyester diols or polycarbonate diols and monomeric diisocyanates in an NCO/OH ratio in the range from 1.5/1 to 2.5/1 and an NCO content in the range from 2% to 8% by weight.

Preferred monomeric diisocyanates are MDI, TDI, IPDI or HDI.

Preferred polyester diols are OH-functional polyesters of adipic acid or sebacic acid or dodecanedicarboxylic acid with butane-1,4-diol or hexane-1,6-diol or neopentyl glycol.

Preferred polycarbonate diols are OH-functional polycarbonates of hexane-1,6-diol.

Such a polymer is typically solid at room temperature and has at least partially crystalline character. The effect of its additional use in the composition, immediately after application, may be elevated creep resistance and/or elevated initial bond strength in the case of use as adhesive.

A further preferred additional polymer containing isocyanate groups is a polyetherurethane polymer containing isocyanate groups and having an NCO content in the range from 1% to 2.5% by weight, especially 1.1% to 2.1% by weight, and a monomeric diisocyanate content of not more than 0.5% by weight, especially not more than 0.3% by weight, obtained from the reaction of IPDI with the above-described polyether triol suitable for preparation of the polyetherurethane polymer of the invention in an NCO/OH ratio of at least 3/1 and subsequent removal of a majority of the unconverted IPDI by means of short-path distillation. It preferably has an average molecular weight $M_n$ in the range from 5000 to 15000 g/mol, especially 6000 to 10 000 g/mol. The additional use of such a polymer can achieve advantages in bonding properties.

A further preferred additional polymer containing isocyanate groups is a linear polyetherurethane polymer containing isocyanate groups and having an NCO content in the range from 0.8% to 2.4% by weight, especially 1.2% to 2.1% by weight, and a monomeric diisocyanate content of not more than 0.3% by weight, obtained from the reaction of 4,4'-MDI with a polyoxypropylene diol having an OH number in the range from 13 to 38 mg KOH/g, especially 22 to 32 mg KOH/g, in an NCO/OH ratio of at least 3/1 and subsequent removal of a majority of the unconverted 4,4'-MDI as described above.

A further preferred additional polymer containing isocyanate groups is a conventionally prepared polyetherurethane polymer containing isocyanate groups and having an NCO content in the range from 1.7% to 2.2% by weight, obtained from the reaction of IPDI with a mixture of polyoxypropylene diol and polyoxypropylene triol, optionally containing fractions of 1,2-ethyleneoxy groups, in an NCO/OH ratio in the range from 1.5/1 to 2.2/1. The additional use of such a polymer can achieve advantages in bonding properties.

A further preferred additional polymer containing isocyanate groups is a conventionally prepared polyetherurethane polymer containing isocyanate groups and having an NCO content in the range from 1.2% to 2.5% by weight, obtained from the reaction of TDI, preferably a mixture of 80% by weight of 2,4-TDI and 20% by weight of 2,6-TDI, with a mixture of polyoxypropylene diol and polyoxypropylene triol, optionally containing fractions of 1,2-ethyleneoxy groups, in an NCO/OH ratio in the range from 1.5/1 to 2/1. The additional use of such a polymer can achieve advantages in bonding properties.

The moisture-curing polyurethane composition preferably additionally contains at least one blocked amine.

A suitable blocked amine preferably has at least one aldimino group or oxazolidino group. On contact with moisture, it is hydrolyzed with release of the amino group and reacts with available isocyanate groups, and can promote rapid, blister-free curing, a particularly nontacky surface and/or particularly good mechanical properties.

Preferred oxazolidines are bisoxazolidines, especially those derived from isobutyraldehyde, benzaldehyde or substituted benzaldehyde, especially benzaldehyde substituted in the para position by an optionally branched alkyl group having 10 to 14 carbon atoms.

Preference is given to bisoxazolidines from the reaction of OH-functional monooxazolidines with diisocyanates, especially hexamethylene 1,6-diisocyanate. Suitable monooxazolidines are especially obtained from the reaction of diethanolamine and an aldehyde with release and removal of water.

Suitable aldimines are especially di- or trialdimines from the reaction of commercial primary di- or triamines with non-enolizable aldehydes. These are aldehydes that do not have a hydrogen atom in the alpha position to the carbon atom of the aldehyde group.

Preferred blocked amines are selected from aldimines of the formula (I) and (II)

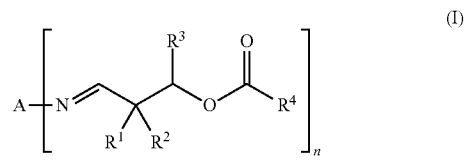

(I)

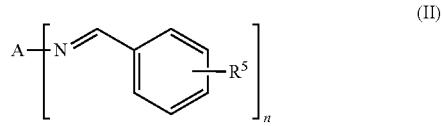

(II)

where n is 2 or 3,

A is an n-valent hydrocarbyl radical optionally including ether oxygen and having a molecular weight in the range from 28 to 6000 g/mol, $R^1$ and $R^2$ are each independently a monovalent hydrocarbyl radical having 1 to 12 carbon atoms, or together are a divalent hydrocarbyl radical having 4 to 12 carbon atoms which is part of an optionally substituted carbocyclic ring having 5 to 8, preferably 6, carbon atoms, $R^3$ is a hydrogen radical or a linear or branched alkyl, arylalkyl or alkoxycarbonyl radical having 1 to 12 carbon atoms, $R^4$ is a hydrogen radical or a monovalent hydrocarbyl radical having 1 to 20 carbon atoms, and $R^5$ is an alkyl or alkoxy radical having 6 to 20 carbon atoms.

A is preferably an aliphatic, cycloaliphatic or arylaliphatic radical, especially having a molecular weight in the range from 28 to 500 g/mol, especially a radical selected from the group consisting of 1,6-hexylene, (1,5,5-trimethylcyclohexan-1-yl)methane-1,3, 4(2)-methyl-1,3-cyclohexylene, 1,3-cyclohexylenebis(methylene), 1,4-cyclohexylenebis(methylene), 1,3-phenylenebis(methylene), 1,2-cyclohexylene, 1,3-cyclohexylene, 1,4-cyclohexylene, methylenebis(2-methylcyclohexan-4-yl), (bicyclo[2.2.1]heptane-2,5(2,6)-diyl)dimethylene, (tricyclo[5.2.1.0$^{2,6}$]decan-3(4), 8(9)-diyl)dimethylene, α,ω-polyoxypropylene having an average molecular weight $M_n$ in the range from 170 to 500 g/mol and trimethylolpropane- or glycerol-started tris(ω-polyoxypropylene) having an average molecular weight $M_n$ in the range from 330 to 500 g/mol.

Preferably, $R^1$ and $R^2$ are each methyl.

Preferably, $R^3$ is a hydrogen radical.

Preferably, $R^4$ is methyl or undecyl.

Preferably, $R^5$ is an optionally branched alkyl radical in the para position having to 14 carbon atoms.

Particularly preferred blocked amines are selected from the group consisting of N,N'-bis(2,2-dimethyl-3-lauroyloxypropylidene)hexylene-1,6-diamine, N,N'-bis(2,2-dimethyl-3-acetoxypropylidene)-3-aminomethyl-3,5,5-trimethylcyclohexylamine, N,N'-bis(2,2-dimethyl-3-lauroyloxypropylidene)-3-aminomethyl-3,5,5-trimethylcyclohexylamine, N,N'-bis(4-$C_{10-14}$-alkylbenzylidene)-3-aminomethyl-3,5,5-trimethylcyclohexylamine, N,N'-bis(2,2-dimethyl-3-acetoxypropylidene)polyoxypropylenediamine having an average molecular weight $M_n$ in the range from 450 to 880 g/mol, N,N'-bis(2,2-dimethyl-3-lauroyloxypropylidene)polyoxypropylenediamine having an average molecular weight $M_n$ in the range from 750 to 1050 g/mol, N,N'-bis(4-$C_{10-14}$-alkylbenzylidene)polyoxypropylenediamine having an average molecular weight $M_n$ in the range from 680 to 1100 g/mol, N,N',N"-tris(2,2-dimethyl-3-acetoxypropylidene)polyoxypropylenetriamine having an average molecular weight $M_n$ in the range from 730 to 880 g/mol, N,N',N"-tris(2,2-dimethyl-3-lauroyloxypropylidene)polyoxypropylenetriamine having an average molecular weight $M_n$ in the range from 1150 to 1300 g/mol and N,N',N"-tris(4-$C_{10-14}$-alkylbenzylidene)polyoxypropylenetriamine having an average molecular weight $M_n$ in the range from 1000 to 1350 g/mol.

The moisture-curing polyurethane composition preferably additionally comprises at least one constituent selected from oligomeric isocyanates, catalysts, fillers and plasticizers.

Suitable oligomeric isocyanates are especially HDI biurets such as Desmodur® N 100 or N 3200 (from Covestro), Tolonate® HDB or HDB-LV (from Vencorex) or Duranate® 24A-100 (from Asahi Kasei); HDI isocyanurates such as Desmodur® N 3300, N 3600 or N 3790 BA (all from Covestro), Tolonate® HDT, HDT-LV or HDT-LV2 (from Vencorex), Duranate® TPA-100 or THA-100 (from Asahi Kasei) or Coronate® HX (from Nippon Polyurethane); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates, for example in solution as Desmodur® Z 4470 (from Covestro) or in solid form as Vestanat® T1890/100 (from Evonik); TDI oligomers such as Desmodur® IL (from Covestro); or mixed isocyanurates based on TDI/HDI, such as Desmodur® HL (from Covestro).

Suitable catalysts are catalysts for the acceleration of the reaction of isocyanate groups, especially organotin(IV) compounds such as, in particular, dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth(III) or zirconium(IV), especially with ligands selected from alkoxides, carboxylates, 1,3-diketonates, oxinate, 1,3-ketoesterates and 1,3-ketoamidates, or compounds containing tertiary amino groups, such as especially 2,2'-dimorpholinodiethyl ether (DMDEE).

If the moisture-curing polyurethane composition contains blocked amines, suitable catalysts are also catalysts for the hydrolysis of the blocked amino groups, especially organic acids, especially carboxylic acids such as 2-ethylhexanoic acid, lauric acid, stearic acid, isostearic acid, oleic acid, neodecanoic acid, benzoic acid, salicylic acid or 2-nitrobenzoic acid, organic carboxylic anhydrides such as phthalic anhydride, hexahydrophthalic anhydride or methylhexahydrophthalic anhydride, silyl esters of carboxylic acids, organic sulfonic acids such as methanesulfonic acid, p-toluenesulfonic acid or 4-dodecylbenzenesulfonic acid, sulfonic esters, other organic or inorganic acids, or mixtures of the aforementioned acids and acid esters. Particular preference is given to carboxylic acids, especially aromatic carboxylic acids, such as benzoic acid, 2-nitrobenzoic acid or especially salicylic acid.

Also especially suitable are combinations of different catalysts.

Suitable fillers are especially ground or precipitated calcium carbonates, optionally coated with fatty acids, especially stearates, barytes, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or hollow beads.

Preference is given to calcium carbonates that have optionally been coated with fatty acids, especially stearates, calcined kaolins or industrially produced carbon blacks.

Suitable plasticizers are especially carboxylic acid esters, such as phthalates, especially diisononyl phthalate (DINP), diisodecyl phthalate (DIDP) or di(2-propylheptyl)phthalate (DPHP), hydrogenated phthalates, especially hydrogenated diisononyl phthalate or diisononyl cyclohexane-1,2-dicarboxylate (DINCH), terephthalates, especially bis(2-ethylhexyl) terephthalate or diisononyl terephthalate, hydrogenated terephthalates, especially hydrogenated bis(2- ethylhexyl) terephthalate or diisononyl terephthalate, or bis(2-ethylhexyl) cyclohexane-1,4-dicarboxylate, trimellitates, adipates, especially dioctyl adipate, azelates, sebacates, benzoates, glycol ethers, glycol esters, organic phosphoric or sulfonic acid esters, polybutenes, polyisobutenes or plasticizers derived from natural fats or oils, especially epoxidized soybean or linseed oil.

The moisture-curing polyurethane composition may contain further additions, especially

- inorganic or organic pigments, especially titanium dioxide, chromium oxides or iron oxides;
- fibers, especially glass fibers, carbon fibers, metal fibers, ceramic fibers, polymer fibers, such as polyamide fibers or polyethylene fibers, or natural fibers, such as wool, cellulose, hemp or sisal;
- nanofillers such as graphene or carbon nanotubes;
- dyes;
- desiccants, especially molecular sieve powder, calcium oxide, highly reactive isocyanates such as p-tosyl isocyanate, monooxazolidines such as Incozol® 2 (from Incorez) or orthoformic esters;
- adhesion promoters, especially organoalkoxysilanes, especially epoxysilanes, such as especially 3-glycidoxypropyltrimethoxysilane or 3-glycidoxypropyltriethoxysilane, (meth)acrylosilanes, anhydridosilanes, carbamatosilanes, alkylsilanes or iminosilanes, or oligomeric forms of these silanes, or titanates;
- further catalysts which accelerate the reaction of the isocyanate groups, especially salts, soaps or complexes of tin, zinc, bismuth, iron, aluminum, molybdenum, dioxomolybdenum, titanium, zirconium or potassium, especially tin(II) 2-ethylhexanoate, tin(II) neodecanoate, zinc(II) acetate, zinc(II) 2-ethylhexanoate, zinc(II) laurate, zinc(II) acetylacetonate, aluminum lactate, aluminum oleate, diisopropoxytitanium bis(ethyl acetoacetate) or potassium acetate; compounds containing tertiary amino groups, especially N-ethyldiisopropylamine, N,N,N',N'-tetramethylalkylenediamines, pentamethylalkylenetriamines and higher homologs thereof, bis(N,N-diethylaminoethyl) adipate, tris(3-dimethylaminopropyl)amine, 1,4-diazabicyclo[2.2.2]octane (DABCO), 1,8-diazabicyclo[5.4.0]undec-7-ene (DBU), 1,5-diazabicyclo[4.3.0]non-5-ene (DBN), N-alkylmorpholines, N,N'-dimethylpiperazine, aromatic nitrogen compounds, such as 4-dimethylaminopyridine, N-methylimidazole, N-vinylimidazole or 1,2-dimethylimidazole; organic ammonium compounds, such as benzyltrimethylammonium hydroxide or alkoxylated tertiary amines; what are called "delayed action" catalysts, which are modifications of known metal or amine catalysts;
- rheology modifiers, especially thickeners, especially sheet silicates, such as bentonites, derivatives of castor oil, hydrogenated castor oil, polyamides, polyamide waxes, polyurethanes, urea compounds, fumed silicas, cellulose ethers or hydrophobically modified polyoxyethylenes;
- solvents, especially acetone, methyl acetate, tert-butyl acetate, 1-methoxy-2-propyl acetate, ethyl 3-ethoxypropionate, diisopropyl ether, diethylene glycol diethyl ether, ethylene glycol diethyl ether, ethylene glycol monobutyl ether, ethylene glycol mono-2-ethylhexyl ether, acetals such as propylal, butylal, 2-ethylhexylal, dioxolane, glycerol formal or 2,5,7,10-tetraoxaundecane (TOU), toluene, xylene, heptane, octane, naphtha, white spirit, petroleum ether or gasoline, especially Solvesso™ grades (from Exxon), and propylene carbonate, dimethyl carbonate, butyrolactone, N-methylpyrrolidone, N-ethylpyrrolidone, p-chlorobenzotrifluoride or benzotrifluoride;
- natural resins, fats or oils, such as rosin, shellac, linseed oil, castor oil or soybean oil;
- non-reactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene-vinyl acetate copolymers (EVA) or atactic poly-α-olefins (APAO);
- flame-retardant substances, especially the aluminum hydroxide or magnesium hydroxide fillers already mentioned, and also especially organic phosphoric acid esters, such as especially triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenylphosphate), bisphenol A bis(diphenylphosphate) or ammonium polyphosphates;
- additives, especially wetting agents, leveling agents, defoamers, deaerators, stabilizers against oxidation, heat, light or UV radiation, or biocides;

or further substances customarily used in moisture-curing polyurethane compositions.

It may be advisable to chemically or physically dry certain substances before mixing them into the composition.

When the inventive polyetherurethane polymer containing isocyanate groups is mixed with further constituents of the composition, especially fillers, the content of monomeric diisocyanates may be reduced by reaction with moisture present.

The moisture-curing polyurethane composition preferably contains

20% to 60% by weight of the polymer of the invention,
20% to 60% by weight of filler,
0% to 35% by weight of plasticizers, and optionally further constituents, especially oligomeric isocyanates, blocked amines, catalysts or further polymers.

The moisture-curing polyurethane composition is especially produced with exclusion of moisture and stored at ambient temperature in moisture-tight containers. A suitable moisture-tight container especially consists of an optionally coated metal and/or plastic, and is especially a drum, a transport box, a hobbock, a bucket, a canister, a can, a bag, a tubular bag, a cartridge or a tube.

The moisture-curing polyurethane composition may be in the form of a one-component composition or in the form of a multi-component, especially two-component, composition.

A composition referred to as a "one-component" composition is one in which all constituents of the composition are in the same container and which is storage-stable per se.

A composition referred to as a "two-component" composition is one in which the constituents of the composition are in two different components which are stored in separate containers and are not mixed with one another until shortly before or during the application of the composition.

The moisture-curing polyurethane composition is preferably a one-component composition. Given suitable packaging and storage, it is storage-stable, typically over several months, up to one year or longer.

On application of the moisture-curing polyurethane composition, the process of curing commences. This results in the cured composition.

In the case of a one-component composition, it is applied as such and then begins to cure under the influence of moisture or water. For acceleration of the curing, an accelerator component which contains or releases water and/or a catalyst and/or a curing agent can be mixed into the composition on application, or the composition, after application thereof, can be contacted with such an accelerator component.

In the course of curing, the isocyanate groups react with one another under the influence of moisture. If the moisture-curing polyurethane composition contains a blocked amine, the isocyanate groups additionally react with the blocked amino groups as they are hydrolyzed. The totality of these reactions of isocyanate groups that lead to the curing of the composition is also referred to as crosslinking.

The moisture required for the curing of the moisture-curing polyurethane composition preferably gets into the composition through diffusion from the air (atmospheric moisture). In the process, a solid layer of cured composition is formed on the surfaces of the composition which come into contact with air ("skin"). The curing continues in the direction of diffusion from the outside inward, the skin becoming increasingly thick and ultimately encompassing the entire composition applied. The moisture can also get into the composition additionally or entirely from one or more substrate(s) to which the composition has been applied and/or can come from an accelerator component which is mixed into the composition on application or is contacted therewith after application, for example by painting or spraying.

The moisture-curing polyurethane composition is preferably applied at ambient temperature, especially in the range from about −10 to 50° C., preferably in the range from −5 to 45° C., especially 0 to 40° C.

The moisture-curing polyurethane composition is preferably likewise cured at ambient temperature.

The moisture-curing polyurethane composition has a long processing time (open time) and rapid curing.

"Open time" refers to the period of time during which the composition can be processed or reprocessed after application without any loss of its ability to function. If the composition is used as adhesive, the open time especially also refers to the period of time within which a bond must have been made after application thereof in order to develop sufficient adhesion. In the case of a one-component composition, the open time has been exceeded when a skin has formed, if not sooner.

The "curing rate" refers to the degree of polymer formation in the composition within a given period of time after application, especially by determining the thickness of the skin formed.

If the moisture-curing polyurethane composition contains a blocked amine, the aldehyde used for the blocking of the amino groups is released in the course of crosslinking. If this is largely volatile, it will remain for the most part in the cured composition and act as plasticizer.

Preference is given to using the moisture-curing polyurethane composition as elastic adhesive or elastic sealant or elastic coating.

The moisture-curing polyurethane composition as adhesive and/or sealant is especially suitable for bonding and sealing applications in the construction and manufacturing industry or in motor vehicle construction, especially for parquet bonding, assembly, bonding of installable components, module bonding, pane bonding, join sealing, bodywork sealing, seam sealing or cavity sealing.

Elastic bonds in motor vehicle construction are, for example, the bonded attachment of parts such as plastic covers, trim strips, flanges, fenders, driver's cabins or other installable components to the painted body of a motor vehicle, or the bonding of panes into the vehicle body, said motor vehicles especially being automobiles, trucks, buses, rail vehicles or ships.

The moisture-curing polyurethane composition is especially suitable as sealant for the elastic sealing of all kinds of joins, seams or cavities, especially of joins in construction, such as expansion joins or connection joins between structural components, or of floor joins in civil engineering. A sealant having flexible properties and high cold flexibility is particularly suitable especially for the sealing of expansion joins in built structures.

As a coating, the moisture-curing polyurethane composition is especially suitable for protection and/or for sealing of built structures or parts thereof, especially for balconies, terraces, roofs, especially flat roofs or slightly inclined roofs areas or roof gardens, or in building interiors beneath tiles or ceramic plates in wet rooms or kitchens, or in collection pans, conduits, shafts, silos, tanks or wastewater treatment systems.

It can also be used for repair purposes as seal or coating, for example of leaking roof membranes or floor coverings that are no longer fit for purpose, or as repair compound for highly reactive spray seals.

The moisture-curing polyurethane composition can be formulated such that it has a pasty consistency with structurally viscous properties. A composition of this kind is applied by means of a suitable device, for example from commercial cartridges or kegs or hobbocks, for example in the form of a bead, which may have an essentially round or triangular cross-sectional area.

The moisture-curing polyurethane composition can also be formulated such that it is fluid and "self-leveling" or only slightly thixotropic and can be poured out for application. As coating, it can, for example, subsequently be distributed flat up to the desired layer thickness, for example by means of a roller, a slide bar, a toothed applicator or a trowel. In one operation, typically a layer thickness in the range from 0.5 to 3 mm, especially 1 to 2.5 mm, is applied.

Suitable substrates which can be bonded or sealed or coated with the moisture-curing polyurethane composition are especially glass, glass ceramic, concrete, mortar, cement screed, fiber cement, especially fiber cement boards, brick, tile, gypsum, especially gypsum boards or anhydride screed, or natural stone, such as granite or marble;

repair or leveling compounds based on PCC (polymer-modified cement mortar) or ECC (epoxy resin-modified cement mortar);

metals or alloys, such as aluminum, copper, iron, steel, nonferrous metals, including surface-finished metals or alloys, such as zinc-plated or chromium-plated metals;

asphalt or bitumen;

leather, textiles, paper, wood, wood materials bonded with resins, such as phenolic, melamine or epoxy resins, resin/textile composites or further materials called polymer composites;

plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;

fiber-reinforced plastics, such as carbon fiber-reinforced plastics (CFP), glass fiber-reinforced plastics (GFP) and sheet molding compounds (SMC);

insulation foams, especially made of EPS, XPS, PUR, PIR, rock wool, glass wool or foamed glass;

coated or painted substrates, especially painted tiles, coated concrete, powder-coated metals or alloys or painted metal sheets;

paints or varnishes, especially automotive topcoats.

If required, the substrates can be pretreated prior to application, especially by physical and/or chemical cleaning methods or the application of an activator or a primer.

It is possible to bond and/or seal two identical or two different substrates.

The invention further provides a method of bonding or sealing, comprising the steps of (i) applying the moisture-curing polyurethane composition described
    to a first substrate and contacting the composition with a second substrate within the open time of the composition, or
    to a first and to a second substrate and joining the two substrates within the open time of the composition, or
    between two substrates,
(ii) curing the composition by contact with moisture.

The invention further provides a method of coating or sealing, comprising the steps of (i) applying the moisture-curing polyurethane composition described to a substrate,
(ii) curing the composition by contact with moisture.

The application and curing of the moisture-curing polyurethane composition or the method of bonding or sealing or the method of coating or sealing affords an article bonded or sealed or coated with the composition. This article may be a built structure or a part thereof, especially a built structure in civil engineering above or below ground, a bridge, a roof, a staircase or a facade, or it may be an industrial good or a consumer good, especially a window, a pipe, a rotor blade of a wind turbine, a domestic appliance or a mode of transport, such as especially an automobile, a bus, a truck, a rail vehicle, a ship, an aircraft or a helicopter, or an installable component thereof.

The invention thus further provides an article obtained from the described method of bonding or sealing or from the described method of coating or sealing.

The moisture-curing polyurethane composition has advantageous properties.

On account of the low monomeric diisocyanate content, it can be handled safely even without special safety precautions and does not require any hazard labeling on account of the monomeric diisocyanates. It is very storage-stable with exclusion of moisture, has very good applicability and has a long processing time (open time) coupled with rapid curing. This gives rise to an elastic material of high extensibility and high strength, high tear propagation resistance, good cold flexibility, good bonding properties and high stability, especially to heat and UV radiation.

EXAMPLES

Working examples are adduced hereinafter, which are intended to elucidate the invention described. The invention is of course not limited to these described working examples.

"Standard climatic conditions" refer to a temperature of 23±1° C. and a relative air humidity of 50±5%.

Unless stated otherwise, the chemicals used were from Sigma-Aldrich.

Polyols Used:

Desmophen® 5031 BT: glycerol-started ethylene oxide-terminated polyoxypropylene triol, OH number 28 mg KOH/g, OH functionality about 2.3 (from Covestro); molecular weight $M_n$ determined by means of GPC about 6000 g/mol Acclaim® 6300: glycerol-started polyoxypropylene triol, OH number 28 mg KOH/g, OH functionality >2.9 (from Covestro); molecular weight $M_n$ determined by means of GPC about 6700 g/mol Voranol® CP 4755: glycerol-started ethylene oxide-terminated polyoxypropylene triol, OH number 35 mg KOH/g, OH functionality about 2.4 (from Dow); molecular weight $M_n$ determined by means of GPC about 4900 g/mol Acclaim® 4200: polyoxypropylene diol, OH number 28 mg KOH/g (from Covestro)

Dynacoll® 7360 polyester diol which is solid and semicrystalline at room temperature, OH number 34 mg KOH/g (from Evonik)

Preparation of Polymers Containing Isocyanate Groups:

Viscosity was measured with a thermostated Rheotec RC30 cone-plate viscometer (cone diameter 25 mm, cone angle 1°, cone tip-plate distance 0.05 mm, shear rate 10 s$^{-1}$).

Average molecular weight (number-average $M_n$) was determined by means of gel permeation chromatography (GPC) against polystyrene (474 to 2 520 000 g/mol) as standard with tetrahydrofuran as mobile phase, refractive index detector and evaluation from 200 g/mol.

Monomeric diisocyanate content was determined by means of HPLC (detection via photodiode array; 0.04 M sodium acetate/acetonitrile as mobile phase) after prior derivatization by means of N-propyl-4-nitrobenzylamine.

Polymer P1: (Inventive)

725.0 g of Desmophen® 5031 BT polyether triol and 275.0 g of diphenylmethane 4,4'-diisocyanate (Desmodur® 44 MC L, from Covestro) were reacted by a known method at 80° C. to give a polyetherurethane polymer having an NCO content of 7.6% by weight, a viscosity of 6.5 Pa·s at 20° C. and a monomeric diphenylmethane 4,4'-diisocyanate content of about 20% by weight. Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polyetherurethane polymer thus obtained had an NCO content of 1.7% by weight, a viscosity of 19 Pa·s at 20° C., a monomeric diphenylmethane 4,4'-diisocyanate content of 0.04% by weight and an average molecular weight $M_n$ of about 6900 g/mol.

Polymer P2: (Noninventive)

724.0 g of Acclaim® 6300 polyether triol and 276.0 g of diphenylmethane 4,4'-diisocyanate (Desmodur® 44 MC L, from Covestro) were reacted by a known method at 80° C. to give a polyetherurethane polymer having an NCO content of 7.5% by weight, a viscosity of 9.9 Pa·s at 20° C. and a monomeric diphenylmethane 4,4'-diisocyanate content of about 20% by weight. Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polyetherurethane polymer thus obtained had an NCO content of 1.7% by weight, a viscosity of 34.7 Pa·s at 20° C., a monomeric diphenylmethane 4,4'-diisocyanate content of 0.06% by weight and an average molecular weight $M_n$ of about 9300 g/mol.

Polymer P3: (Noninventive)

682.9 g of Voranol® CP 4755 polyether triol and 317.0 g of diphenylmethane 4,4'-diisocyanate (Desmodur® 44 MC L, from Covestro) were reacted by a known method at 80° C. to give a polyetherurethane polymer having an NCO content of 8.8% by weight, a viscosity of 5.1 Pa·s at 20° C. and a monomeric diphenylmethane 4,4'-diisocyanate content of about 25% by weight. Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polyetherurethane polymer thus obtained had an NCO content of 2.0% by weight, a viscosity of 16.8 Pa·s at 20° C., a monomeric diphenylmethane 4,4'-diisocyanate content of 0.05% by weight and an average molecular weight $M_n$ of about 5700 g/mol.

Polymer P4: (Noninventive)

727.0 g of Acclaim® 4200 polyether diol and 273.0 g of diphenylmethane 4,4'-diisocyanate (Desmodur® 44 MC L, from Covestro) were reacted by a known method at 80° C. to give a polyetherurethane polymer having an NCO content of 7.6% by weight, a viscosity of 5.2 Pa·s at 20° C. and a monomeric diphenylmethane 4,4'-diisocyanate content of about 18% by weight. Subsequently, the volatile constituents, especially a majority of the monomeric diphenylmethane 4,4'-diisocyanate, were removed by distillation in a short-path evaporator (jacket temperature 180° C., pressure 0.1 to 0.005 mbar, condensation temperature 47° C.). The polyetherurethane polymer thus obtained had an NCO content of 1.8% by weight, a viscosity of 15.2 Pa·s at 20° C. and a monomeric diphenylmethane 4,4'-diisocyanate content of 0.08% by weight.

Polymer P5: (Noninventive)

1000 g of Dynacoll® 7360 polyether diol and 142 g of diphenylmethane 4,4'-diisocyanate (Desmodur® 44 MC L, from Covestro) were reacted by a known method at 80° C. to give a room temperature solid polymer having an NCO content of 2.0% by weight and a monomeric diphenylmethane 4,4'-diisocyanate content of 2.3% by weight.

Polymer P5 is a conventionally prepared room temperature solid polymer that can be used to improve the initial bond strength of an adhesive.

Preparation of Blocked Amines:

Aldimine A1: N,N'-Bis(2,2-dimethyl-3-lauroyloxypropylidene)-3-aminomethyl-3,5,5-trimethylcyclohexylamine 100.0 g (0.35 mol) of 2,2-dimethyl-3-lauroyloxypropanal were initially charged in a round-bottom flask under a nitrogen atmosphere. Then 27.9 g (0.16 mol) of 3-aminomethyl-3,5,5-trimethylcyclohexylamine (Vestamin® IPD, from Evonik) were added with good stirring and then the volatile constituents were removed at 80° C. and a reduced pressure of 10 mbar. What was obtained was a colorless liquid having an amine value of 153 mg KOH/g, corresponding to a calculated aldimine equivalent weight of 367 g/mol.

Moisture-Curing Polyurethane Compositions:

Compositions Z1 to Z4:

For each composition, the ingredients specified in table 1 were mixed in the amounts specified (in parts by weight) by means of a planetary mixer under reduced pressure and with exclusion of moisture, and stored with exclusion of moisture.

The thickener paste was produced by gently heating an initial charge of 300 g of diisodecyl phthalate and 48 g of diphenylmethane 4,4'-diisocyanate (Desmodur® 44 MC L, from Covestro) in a vacuum mixer and then slowly adding 27 g of monobutylamine dropwise while stirring vigorously. The resultant paste was stirred for a further hour under reduced pressure while cooling.

Each composition was tested as follows:

As a measure of storage stability, the expression force of the composition after storage was determined by storing one closed cartridge in each case at room temperature for 7 days or at 60° C. in an air circulation oven for 7 days, and then measuring the expression force by means of an expression device (Zwick/Roell Z005). For this purpose, the cartridge, after being conditioned under standard climatic conditions for 12 hours, was opened, a nozzle of internal diameter 3 mm was screwed on to the cartridge and then the force required to express the composition through the nozzle at an expression rate of 60 mm/min was measured. The value reported is the average of the forces that were measured after an expression distance of 22 mm, 24 mm, 26 mm and 28 mm. The results are given the addition "7d RT" or "7d 60°C" according to the manner of storage of the closed cartridge.

A measure determined for the processing time (open time) was the skin time. For this purpose, a few grams of the composition were applied to cardboard in a layer thickness of about 2 mm and, under standard climatic conditions, the time until there were for the first time no longer any residues remaining on an LDPE pipette used to gently tap the surface of the composition was determined. Curing rate was determined by applying the composition as a free-standing cone of diameter 3 cm, leaving it to stand under standard climatic conditions or at 10° C./50% relative humidity, cutting it open with a crosscut after 24 h and measuring the layer thickness of the cured polymer ring formed. These results are reported in table 2 as "after 24 h" with the addition "(SCC)" or "(10° C./50%)" according to the climatic conditions on curing. Additional cones were cut open after a few days, and the thickening cured layer was determined until it was at least 10 mm. What is reported as "for 10 mm" in table 2 is the time until attainment of a cured layer of layer thickness at least 10 mm.

For determination of mechanical properties and heat stability, each composition was pressed between two wax-coated transfer printing papers to give a film of thickness 2 mm and stored under standard climatic conditions for 14 days. After removing the wax papers, some test specimens were punched out and tested as described as follows:

For determination of tensile strength ("TS"), elongation at break and modulus of elasticity at 0.5-50% elongation ("MoE 50%"), dumbbells having a length of 75 mm with a bar length of 30 mm and a bar width of 4 mm were punched out of the film, and these were tested to DIN EN 53504 at a strain rate of 200 mm/min. These results are given the addition "14 d SCC". As a measure of heat stability, further punched-out dumbbells were stored at 90° C. in an air circulation oven for 7 days, cooled down under standard climatic conditions and tested in the same way. These results are given the addition "7 d 90° C.".

Moreover, some test specimens, for determination of tear propagation resistance ("Tear prop."), were punched out and tested to DIN ISO 34 at a strain rate of 500 mm/min.

To determine the strength of an adhesive bond, lap shear strength (LSS) was determined on glass. For this purpose, test specimens were produced by bonding two glass plates that had been degreased with isopropanol and pretreated with Sika® Aktivator 100 (from Sika Schweiz) in such a way that the overlapping adhesive bond had dimensions of 12×25 mm and a thickness of 4 mm and the glass plates protruded at the top ends. After the composite bodies had been stored under standard climatic conditions for 14 d, lap shear strength was tested to DIN EN 1465 at a strain rate of 20 mm/min. As a measure of the heat and hydrolysis stability of the bond, further test specimens were additionally stored in an air circulation oven at 90° C. or at 70° C./100% relative humidity for 7 days, cooled down under standard climatic conditions and tested in the same way. The results are given the addition "14d SCC" or "7d 90° C." or "7d 70/100". Shore A hardness was determined according to DIN 53505 on test specimens cured under standard conditions for 1 d, 2 d and 7 d. The evolution of Shore A hardness also served as a measure of curing rate. These results are given the addition "1d SCC" or "2d SCC or "7d SCC". As a measure of heat and hydrolysis stability, Shore A test specimens that had been stored in this way were additionally stored in an air circulation oven at 90° C. or at 70° C./100% relative humidity for 7 and 30 days, and Shore A hardness was determined after cooling under standard climatic conditions. These results are given the addition "+7d 90° C." or "+30d 90° C." or "+7d 70/100" or "+30d 70/100".

60% tensile stress and 100% tensile stress were determined with concrete test specimens (pretreated with Sika® Primer 3N, from Sika Schweiz), in each case at 23° C. and at −20° C. to DIN EN 28339, Method A. A low value at −20° C. and a small rise in the value between 23 and −20° C. show high cold flexibility. Additionally used as a measure of yellowing was the change in color of a film cured under standard climatic conditions after the time specified in table 2 and storage under standard climatic conditions "SCC" on a windowsill, or after stress in a QUV system "QUV", or after stress in a weathering tester of the Q-Sun Xenon Xe-1 type with a Q-SUN Daylight-Q optical filter and a xenon lamp having a light intensity of 0.51 W/m² at 340 nm at a temperature of 65° C. ("Q-Sun"). The color difference ΔE of the stressed film versus the corresponding unstressed film was then determined using an NH310 colorimeter from Shenzen 3NH Technology Co. LTD equipped with silicon photoelectric diode detector, light source A, color space measurement interface CIE L*a*b*C*H*. A high ΔE value means a great difference in color.

As a comparative example (Ref.), Sikaflex®-11FC⁺ (from Sika) was tested in the same way. Sikaflex®-11FC⁺ is a commercially available elastic moisture-curing polyurethane sealant/adhesive having a monomeric diisocyanate content of less than 0.1% by weight, based on polyetherurethane polymers containing isocyanate groups, which have been produced conventionally without removal of the excess monomeric diisocyanates.

The results are reported in table 2.

The compositions labeled "(Ref.)" are comparative examples.

TABLE 1

Composition (in parts by weight) of Z1 to Z4.

| Composition | Z1 | Z2 | Z3 (Ref.) | Z4 (Ref.) |
|---|---|---|---|---|
| Polymer P1 | 25.00 | 17.00 | — | — |
| Polymer P2 | — | — | 25.00 | 17.00 |
| Polymer P4 | — | 8.00 | — | 8.00 |
| Diisodecyl phthalate | 4.00 | 4.00 | 4.00 | 4.00 |
| Thickener paste | 23.00 | 23.00 | 23.00 | 23.00 |
| Aldimine A1 | 0.90 | 0.90 | 0.90 | 0.90 |
| p-Toluenesulfonyl isocyanate | 0.10 | 0.10 | 0.10 | 0.10 |
| Epoxysilane[1] | 0.50 | 0.50 | 0.50 | 0.50 |
| Salicylic acid solution[2] | 1.50 | 1.50 | 1.50 | 1.50 |
| Dibutyltin dilaurate | 0.01 | 0.01 | 0.01 | 0.01 |
| Chalk[3] | 40.00 | 40.00 | 40.00 | 40.00 |
| Titanium dioxide | 5.00 | 5.00 | 5.00 | 5.00 |

[1] 3-Glycidoxypropyltrimethoxysilane
[2] 5% by weight of salicylic acid in dioctyl adipate
[3] Omya BSH® — OM (from Omya)

TABLE 2

Properties of Sikaflex ®-11FC⁺ (comparison) and Z1 to Z4.

| Composition | | Sikaflex ® 11FC⁺ (Ref.) | Z1 | Z2 | Z3 (Ref.) | Z4 (Ref.) |
|---|---|---|---|---|---|---|
| Expression force [N] RT (3 mm nozzle) | 7 d | 415 | 640 | 560 | 690 | 590 |
| | 7 d 60° C. | 620 | 815 | 740 | 935 | 740 |
| Skin time [min] | | 50 | 80 | 110 | 50 | 90 |
| Curing rate: | (SCC) after 24 h for 10 mm | 3.5 mm | 3.8 mm | 3.4 mm | 3.8 mm | 3.6 mm |
| | | 10 d | 7 d | 8 0 | 8 d | 8 d |
| | (10° C./50%) after 24 h for 10 mm | 2.1 mm | 2.6 mm | 2.1 mm | 2.5 mm | 2.2 mm |
| | | 21 d | 15 d | 15 d | 16 d | 16 d |
| 14d SCC: | TS [MPa] | 1.73 | 1.62 | 1.83 | 1.14 | 1.15 |
| | Elongation at break [%] | 830 | 620 | 815 | 260 | 360 |
| | MoE 50% [MPa] | 1.03 | 1.13 | 1.06 | 1.71 | 1.59 |
| 7d 90° C.: | TS [MPa] | 1.18 | 1.73 | 1.26 | 1.24 | 1.30 |
| | Elongation at break [%] | 875 | 725 | 875 | 295 | 465 |
| | MoE 50% [MPa] | 0.76 | 1.10 | 0.91 | 1.90 | 1.59 |
| Tear prop. | [N/mm] | 7.1 | 7.1 | 8.0 | 4.4 | 5.3 |
| LSS [MPa] | 14 d SCC | 0.93 | 0.84 | 0.94 | 0.75 | 0.77 |
| | 7 d 90° C. | 0.83 | 0.98 | 0.83 | 0.82 | 0.86 |
| | 7 d 70/100 | 0.59 | 0.84 | 0.85 | 0.74 | 0.75 |

TABLE 2-continued

Properties of Sikaflex ®-11FC+ (comparison) and Z1 to Z4.

| Composition | | Sikaflex ® 11FC+ (Ref.) | Z1 | Z2 | Z3 (Ref.) | Z4 (Ref.) |
|---|---|---|---|---|---|---|
| Shore A | 1 d SCC | 10 | 30 | 20 | 41 | 38 |
| | 2 d SCC | 19 | 37 | 31 | 49 | 46 |
| | 7 d SCC | 32 | 38 | 33 | 50 | 46 |
| | +7 d 90° C. | 29 | 37 | 29 | 51 | 43 |
| | +30 d 90° C. | 24 | 37 | 28 | 51 | 41 |
| | +7 d 70/100 | 24 | 37 | 31 | 50 | 44 |
| | +30 d 70/100 | 18 | 32 | 26 | 45 | 40 |
| 60% tensile stress [MPa] | at 23° C. | 0.45 | 0.65 | 0.58 | tears | 0.88 |
| | at −20° C. | 0.98 | 0.90 | 0.87 | 1.37 | 1.22 |
| 100% tensile stress [MPa] | at 23° C. | 0.52 | 0.72 | 0.64 | tears | tears |
| | at −20° C. | 1.13 | 1.12 | 1.00 | 1.39 | 1.26 |
| Yellowing ΔE after | 1000 h SCC | 3.6 | 0.9 | not determined | not determined | not determined |
| | 1000 h Q-Sun | 6.1 | 3.2 | | | |
| | 1000 h QUV | 12.2 | 8.7 | | | |

Table 2 shows the properties of one-component polyurethane compositions having no labeling. The comparison of the inventive composition Z1 with the commercial product Sikaflex®-11FC+ shows a massive improvement in stability with respect to heat and yellowing coupled with faster curing. The comparison of compositions Z1 and Z2 based on the inventive polymer P1 with reference compositions Z3 and Z4 based on the noninventive polymer P2 proceeding from a triol having higher functionality in each case shows a longer open time (skin time) coupled with somewhat faster curing, massively higher elongation at break coupled with distinctly higher strength and higher tear propagation resistance, each of which are at the level of the commercial product Sikaflex®-11FC+.

Compositions Z5 and Z6:

For each composition, the ingredients specified in table 3 were mixed in the amounts specified (in parts by weight) by means of a planetary mixer under reduced pressure and with exclusion of moisture, and stored with exclusion of moisture. Each composition was tested as follows:

Expression force was tested as for composition Z1, except using a nozzle of internal diameter 5 mm, and with determination of an additional value after storage at 60° C. for 14 days.

Skin time and tear propagation resistance were tested as for composition Z1. Tensile strength and elongation at break were tested as for composition Z1, except that modulus of elasticity (0.5-5%) was read off in the range from 0.5% to 5% elongation. As a measure of heat and hydrolysis stability, further dumbbells were stored in an air circulation oven at 100° C. or at 70° C./100% relative humidity for 7 days, cooled down under standard climatic conditions and tested in the same way. These results are given the addition "7d 100° C." or "7d 70/100".

Lap shear strength (LSS) was tested as for composition Z1.

As a measure of opening time at 35° C./80% relative humidity, bonding after wait time was tested by degreasing multiple glass plates of size 40×100 mm with isopropanol, pretreating with Sika® Aktivator 100 (from Sika Schweiz) and then applying the composition at 35° C./80% relative humidity in longitudinal direction in the form of a triangular bead (10×10×10 mm). Subsequently, these test specimens were stored at 35° C./80% relative humidity for the wait time specified in table 3 (3 min up to 12 min), then covered with a piece of Teflon paper, and the triangular bead was compressed to a thickness of 4.5 mm and stored in this way for 7 d, in the course of which the composition applied cured. Subsequently, the Teflon paper was removed and the bonding of the compressed bead on the glass plate was tested by making an incision into the cured composition at the narrow end just above the bonding surface, holding the cut end of the composition with rounded tweezers and trying to pull the composition away from the substrate. Then the composition was incised again down to the substrate, the part that had been cut away was rolled up with the rounded tweezers and an attempt was again made to pull the composition away from the substrate. In this way, the composition was cut away from the substrate by pulling over a length of 80 mm. Subsequently, bonding was assessed with reference to the failure profile using the following scale:

"very good" represents more than 95% cohesive failure,
"good" represents 75% to 95% cohesive failure,
"moderate" represents 25% to 75% cohesive failure,
"poor" represents less than 25% cohesive failure, and
"no adhesion" represents 0% cohesive failure or 100% adhesive failure The end of the open time has been reached as soon as adhesion is no longer "very good".

The results are reported in table 3.

The compositions labeled "(Ref.)" are comparative examples.

TABLE 3

Composition (in parts by weight) and properties of Z5 and Z6.

| Composition | | Z5 | Z6 (Ref.) |
|---|---|---|---|
| Polymer P1 | | 34.3 | — |
| Polymer P3 | | — | 34.3 |
| Polymer P5 | | 4.0 | 4.0 |
| Dioctyl adipate | | 22.5 | 22.5 |
| Chalk | | 21.0 | 21.0 |
| Carbon black | | 18.0 | 18.0 |
| 2,2'-Dimorpholinodiethyl ether | | 0.2 | 0.2 |
| Expression force [N] (5 mm nozzle) | 7 d RT | 1377 | 1238 |
| | 7 d 60° C. | 1407 | 1424 |
| | 14 d 60° C. | 1446 | 1534 |
| Skin time [min] | | 18 | 18 |
| 7 d SCC: | Tensile strength [MPa] | 7.1 | 6.2 |
| | Elongation at break [%] | 480 | 300 |
| | Elastic modulus (0.5-5%) [MPa] | 4.8 | 6.1 |

TABLE 3-continued

Composition (in parts by weight) and properties of Z5 and Z6.

| Composition | | Z5 | Z6 (Ref.) |
|---|---|---|---|
| 7 d 100° C.: | Tensile strength [MPa] | 8.7 | 7.1 |
| | Elongation at break [%] | 480 | 280 |
| | Elastic modulus (0.5-5%) [MPa] | 4.0 | 5.0 |
| 7 d 70/100: | Tensile strength [MPa] | 8.5 | 7.5 |
| | Elongation at break [%] | 470 | 300 |
| | Elastic modulus (0.5-5%) [MPa] | 3.6 | 4.7 |
| Tear propagation resistance [N/mm] | | 10.9 | 8.9 |
| Lap shear strength [MPa] | 14 d SCC | 3.3 | 4.0 |
| | 7 d 70/100 | 3.7 | 4.5 |
| Adhesion after wait time (35° C./80% RH) | 3 min | very good | very good |
| | 4 min | very good | very good |
| | 5 min | very good | very good |
| | 6 min | very good | very good |
| | 7 min | very good | good |
| | 8 min | very good | good |
| | 9 min | very good | moderate |
| | 10 min | very good | poor |
| | 11 min | good | poor |
| | 12 min | moderate | no adhesion |

It is apparent from table 3 that composition Z5 based on the inventive polymer P1, compared to composition Z6 based on the noninventive polymer P3 with a somewhat shorter chain length (higher NCO value and high OH number of the parent triol), has higher elongation coupled with higher tensile strength, higher tear propagation resistance and longer open time in the bonding of glass under moist and warm conditions.

The invention claimed is:

1. A polyetherurethane polymer containing isocyanate groups, wherein
    the polyetherurethane polymer has an NCO content in the range from 1.3% to 1.9% by weight, and a monomeric diisocyanate content of not more than 0.5% by weight, and
    wherein the polyetherurethane polymer is obtained from a reaction of at least one monomeric aromatic diisocyanate and a polyether triol in an NCO/OH ratio of at least 3/1 and subsequent removal of a majority of the monomeric aromatic diisocyanate by means of a suitable separation method,
    wherein the monomeric aromatic diisocyanate is diphenylmethane 4,4'-diisocyanate,
    wherein the polyether triol (i) has an OH number in the range from 25 to 32 mg KOH/g, (ii) contains an amount of monools such that the polyether triol has an average OH functionality in the range from 2.2 to 2.6 and (iii) based on all repeat units, has 80% to 90% by weight of 1,2-propyleneoxy groups and 10% to 20% by weight of 1,2-ethyleneoxy groups.

2. The polymer as claimed in claim 1, wherein the polyetherurethane polymer has an average molecular weight $M_n$ in the range from 5,000 to 15,000 g/mol, determined by means of gel permeation chromatography versus polystyrene standard with tetrahydrofuran as mobile phase, refractive index detector and evaluation from 200 g/mol.

3. The polymer as claimed in claim 1, wherein the excess monomeric diisocyanate is removed by a distillative method.

4. The polymer as claimed in claim 1, wherein the NCO content of the polyetherurethane polymer is at least 80% of a theoretical NCO content which is calculated from the addition of one mole of monomeric diisocyanate per mole of OH groups of the polyether triol.

5. A moisture-curing polyurethane composition having a monomeric diisocyanate content of less than 0.1% by weight based on the overall composition, containing the polyetherurethane polymer as claimed in claim 1.

6. The composition as claimed in claim 5, wherein the composition has a content of the polyetherurethane polymer in the range from 10% to 80% by weight.

7. The composition as claimed in claim 5, wherein the composition additionally comprises at least one blocked amine.

8. The composition as claimed in claim 5, wherein the composition additionally comprises at least one further constituent selected from the group consisting of oligomeric isocyanates, catalysts, fillers and plasticizers.

9. A method of adhesive bonding or sealing, comprising the steps of
    (i) applying the composition as claimed in claim 5
       to a first substrate and contacting the composition with a second substrate within the open time of the composition, or
       to a first and to a second substrate and joining the two substrates within the open time of the composition, or
       between two substrates, and
    (ii) curing the composition by contact with moisture.

10. A method of coating or sealing, comprising the steps of
    (i) applying the composition as claimed in claim 5 to a substrate, and
    (ii) curing the composition by contact with moisture.

11. An article obtained from the method as claimed in claim 9.

* * * * *